(12) United States Patent
Wetzel

(10) Patent No.: US 7,784,349 B2
(45) Date of Patent: Aug. 31, 2010

(54) VIBRATOR TABLE FRAME

(75) Inventor: Joseph D. Wetzel, Hudsonville, MI (US)

(73) Assignee: Venturedyne, Ltd., Pewaukee, WI (US)

( * ) Notice: Subject to any disclaimer, the term of this patent is extended or adjusted under 35 U.S.C. 154(b) by 438 days.

(21) Appl. No.: 11/845,530

(22) Filed: Aug. 27, 2007

(65) Prior Publication Data
US 2009/0056457 A1 Mar. 5, 2009

(51) Int. Cl.
*G01M 7/00* (2006.01)
(52) U.S. Cl. ............................. 73/663; 73/570; 73/662
(58) Field of Classification Search .................. 73/663, 73/570, 662
See application file for complete search history.

(56) References Cited

U.S. PATENT DOCUMENTS

| | | | |
|---|---|---|---|
| 2,438,756 A | 3/1948 | Larsen | |
| 2,706,400 A | 4/1955 | Unholtz | |
| 3,026,489 A * | 3/1962 | Gold | 332/167 |
| 3,277,696 A * | 10/1966 | Gertel | 73/665 |
| 3,640,508 A * | 2/1972 | Reibig | 366/116 |
| 3,691,822 A | 9/1972 | Deckard | |
| 3,748,896 A | 7/1973 | Barrows | |
| 4,106,586 A | 8/1978 | Stafford | |
| 4,164,151 A * | 8/1979 | Nolan et al. | 73/663 |
| 4,735,089 A | 4/1988 | Baker et al. | |
| 4,875,374 A * | 10/1989 | Pinson | 73/663 |
| 5,154,567 A | 10/1992 | Baker et al. | |
| 5,412,991 A | 5/1995 | Hobbs | |
| 5,594,177 A | 1/1997 | Hanse | |
| 5,804,732 A | 9/1998 | Wetzel et al. | |
| 6,220,100 B1 * | 4/2001 | Felkins et al. | 73/663 |
| 6,714,419 B2 * | 3/2004 | Liken et al. | 361/752 |
| 2006/0174709 A1 * | 8/2006 | Hobbs | 73/649 |
| 2009/0031815 A1 * | 2/2009 | Lim et al. | 73/663 |

* cited by examiner

*Primary Examiner*—J M Saint Surin
(74) *Attorney, Agent, or Firm*—Jansson Shupe & Munger Ltd.

(57) ABSTRACT

In a preferred embodiment, a vibrator table apparatus includes a primary table member driven by at least two vibrators, having upper and lower surfaces and defining x and y axes. The improvement of this embodiment includes at least one of the upper and lower surfaces of the primary table member defining an opening for each of a first plurality of substantially parallel channels and an opening for each of a second plurality of substantially parallel channels substantially perpendicular to the first plurality of channels.

28 Claims, 10 Drawing Sheets

FIG. 10 - Prior Art

VIBRATOR TABLE FRAME

FIELD OF THE INVENTION

This invention relates to vibrator testing tables and, more particularly, to a new table frame design.

BACKGROUND OF THE INVENTION

Few products are sold by their manufacturer without some type of testing being conducted. Such testing may be as simple as manually ascertaining whether certain parts are securely affixed—or as complex as "stress testing." In stress testing (or "stress screening" as it is sometimes called), products exhibiting "infant mortality" fail outright during the test. Or as the result of such testing, a product may evidence the likelihood of early failure in the operating environment.

Stress testing is most frequently employed with respect to products used in demanding applications and for which exceptionally-high reliability is required. Examples include products used on ground-traveling military equipment and products (e.g., electronic and electromechanical products) used in aircraft of essentially all types.

Stress testing may be carried out in any of several different ways. One type of test regimen involves imposing rapid, extreme changes in temperature upon the product. As an example, a test chamber may be used to change the temperature of a product between −70 degree C. and 200 degree C. over a period of, say, 5 minutes. Another type of test regimen involves using a test chamber to repetitively and dramatically change the relative humidity of air around a product. And humidity-based testing may also be accompanied by temperature-based testing and vice versa.

Yet another type of stress testing involves testing a product by subjecting it to vibrations of the type which might be encountered in actual product use. For example, U.S. Pat. No. 2,438,756 (Larsen) explains that the apparatus described therein is used to vibration-test electrical apparatus for airplanes, ships and the like. The unit described in U.S. Pat. No. 3,748,896 (Barrows) is said to be used for testing parts of a motor vehicle. And vibration testing is often conducted in conjunction with testing using another regimen, e.g., temperature.

Vibration testing is carried out by mounting the product to be tested upon some sort of platform or table and then vibrating the table using a rotating eccentric or a linear vibrator. Examples of devices used to create vibratory motion are shown in the Barrows patent and in U.S. Pat. Nos. 4,106,586 (Stafford) and 5,154,567 (Baker et al.).

In general, tables used to stress test products by application of vibration to such products are of two broad types, namely, flexible and rigid. An example of the former is disclosed in U.S. Pat. No. 4,735,089 (Baker et al.) and has a flexure member, i.e., a honeycomb structure, between two plates. An example of the latter is disclosed in FIGS. 12-14 of U.S. Pat. No. 5,412,991 (Hobbs) and has a rigid core plate between upper and lower plates.

While the prior art vibrator tables have been generally satisfactory for their intended purposes, they are not without disadvantages. In multi-degree freedom of testing vibration typically occurs on 3 axes, x, y and z. In a rigid table design there is significantly more vibration energy in one axis (typically the z-axis). A further disadvantage is that minimal energy is imparted in the 0-1000 Hz bandwidth. This rigid design has led to flexible table designs having a grouping of segmented plates, a composite of layers of different materials or combination of the two. These tables have acted to increase the energy in the 0-1000 Hz bandwidth but still did not normalize the energy between the three axes.

A disadvantage to known flexible tables is that they are highly expensive to manufacture since they utilize complex layering that is difficult to produce. Furthermore, such tables wear out or fail more rapidly since the materials used, or the interface adhering the materials together, deteriorate over time.

Therefore, an improved vibrator-driven table frame overcoming some of the problems and shortcomings of the prior art would be a distinct advance.

OBJECTS OF THE INVENTION

It is an object of the invention to provide an improved vibrator table frame that overcomes some of the problems and shortcomings of the prior art, including those referred to above.

Another object of the invention is to provide an improved vibrator table flame that is of a flexible design that is easy and/or inexpensive to manufacture.

Another object of the invention is to provide an improved vibrator table frame that equalized energy levels across the X, Y and Z axes.

Another object of the invention is to provide an improved vibrator table frame that improves energy imparted to the object being tested between 0 and 1000 Hz.

How these and other objects are accomplished will become apparent from the following descriptions and the drawings.

SUMMARY OF THE INVENTION

In a preferred embodiment, a vibrator table apparatus includes a primary table member driven by at least two vibrators, having upper and lower surfaces and defining x and y axes. The improvement of this embodiment includes at least one of the upper and lower surfaces of the primary table member defining an opening for each of a first plurality of substantially parallel channels and an opening for each of a second plurality of substantially parallel channels substantially perpendicular to the first plurality of channels.

In a second embodiment, the first plurality of channels is substantially parallel with the x-axis. Alternatively, the first plurality of channels could be offset from parallel to the x-axis. In such an embodiment, it would be preferable that the offset from parallel to the x-axis by about 45 degrees.

In a third embodiment, the at least one of the upper and lower surfaces is the upper surface. The lower surface then defines an opening for each of a third plurality of substantially parallel channels and an opening for each of a fourth plurality of substantially parallel channels substantially perpendicular to the third plurality of channel, whereby the upper surface of the member includes a plurality of platforms.

In another embodiment, the first plurality of channels defined by the at least one of the upper and lower surfaces are spaced substantially equally from one another and the second plurality channels defined by the at least one of the upper and lower surfaces are spaced substantially equally from one another, thereby creating a grid of intersecting channels.

In a further embodiment, the channels of each of the first, second, third and fourth pluralities channels are spaced substantially equally apart from one another, thereby creating an upper and a lower grid of intersecting channels.

In yet other embodiments, the first plurality of channels and the third plurality of channels, and/or the second plurality of channels and fourth plurality of channels are offset from one another.

In still further embodiments at least one intersection of a first plurality channel with a second plurality channel, if not most of the intersections, defines an opening.

In another embodiment, a primary table member for use in a vibrator table apparatus includes an upper surface, a lower surface, two length sides and two width sides. The member also includes a first plurality of channels defined substantially parallel to each other in the member, extending between two of the sides and open on the top surface of the member; and a second plurality of channels defined substantially parallel to each other in the member, extending between two of the sides and open on the top surface of the member.

In a further embodiment, the table member includes a third plurality of channels defined substantially parallel to each other in the member, extending between two of the sides and open on the bottom surface of the member; and a fourth plurality of channels defined substantially parallel to each other in the member, extending between two of the sides and open on the bottom surface of the member.

In other embodiments, the first and third pluralities of channels extend between the two width sides. Alternatively, each of the channels in the first and third pluralities of channels could extend between a length side and a width side.

In yet other embodiments, the first and second pluralities of channels are substantially perpendicular to each other, and/or the third and fourth pluralities of channels are substantially perpendicular to each other.

In a still further embodiment, a method is disclosed wherein the method includes providing a testing apparatus, the apparatus including a primary table member and a plurality of vibrators attached to the primary table member. The member having an upper surface, a lower surface, two length sides, two width sides. The member further including a first plurality of channels defined substantially parallel to each other in the member, extending between two of the sides and open on the top surface of the member and a second plurality of channels defined substantially parallel to each other in the member, extending between two of the sides and open on the on the top surface of the member. The method next including securing a product to be tested to the primary table member and energizing the vibrators.

In another embodiment, the method also includes utilizing a table member that includes a third plurality of channels defined substantially parallel to each other in the member, extending between two of the sides and open on the bottom surface of the member and a fourth plurality of channels defined substantially parallel to each other in the member, extending between two of the sides and open on the bottom surface of the member.

The benefit of the present invention is two-fold: first, it allows for more vibration energy to be transferred to the object to be tested below 1000 Hz and second, it allows the energy to be more consistent between the x, y and z axes. This is shown in FIGS. 10 and 11. FIG. 10 shows energy transferred in a typical prior art table frame design. As can be seen on the x and y axes little energy is transferred below 1000 Hz. Furthermore, the energy in the z-axis is much greater than in the x-axis or y-axis.

Comparatively, in FIG. 11 the energy transfer of a table made according to the present invention is shown. This chart shows improved energy transfer below 1000 Hz and much more consistent energies across the x, y and z axes.

DETAILED DESCRIPTION OF PREFERRED EMBODIMENTS

Figure 1:
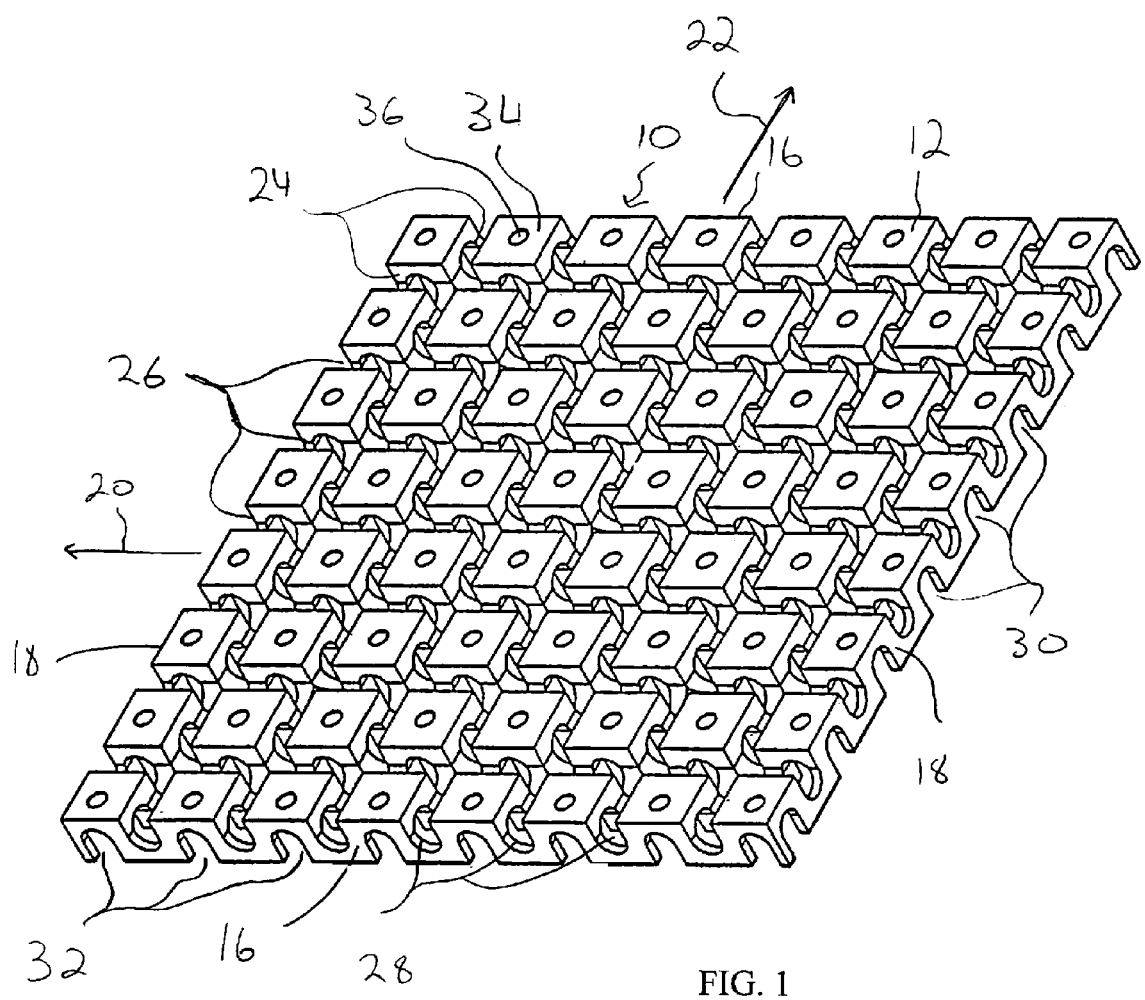
FIG. 1 is a perspective top view of a preferred embodiment of a table frame in accordance with this invention.
Figure 2:
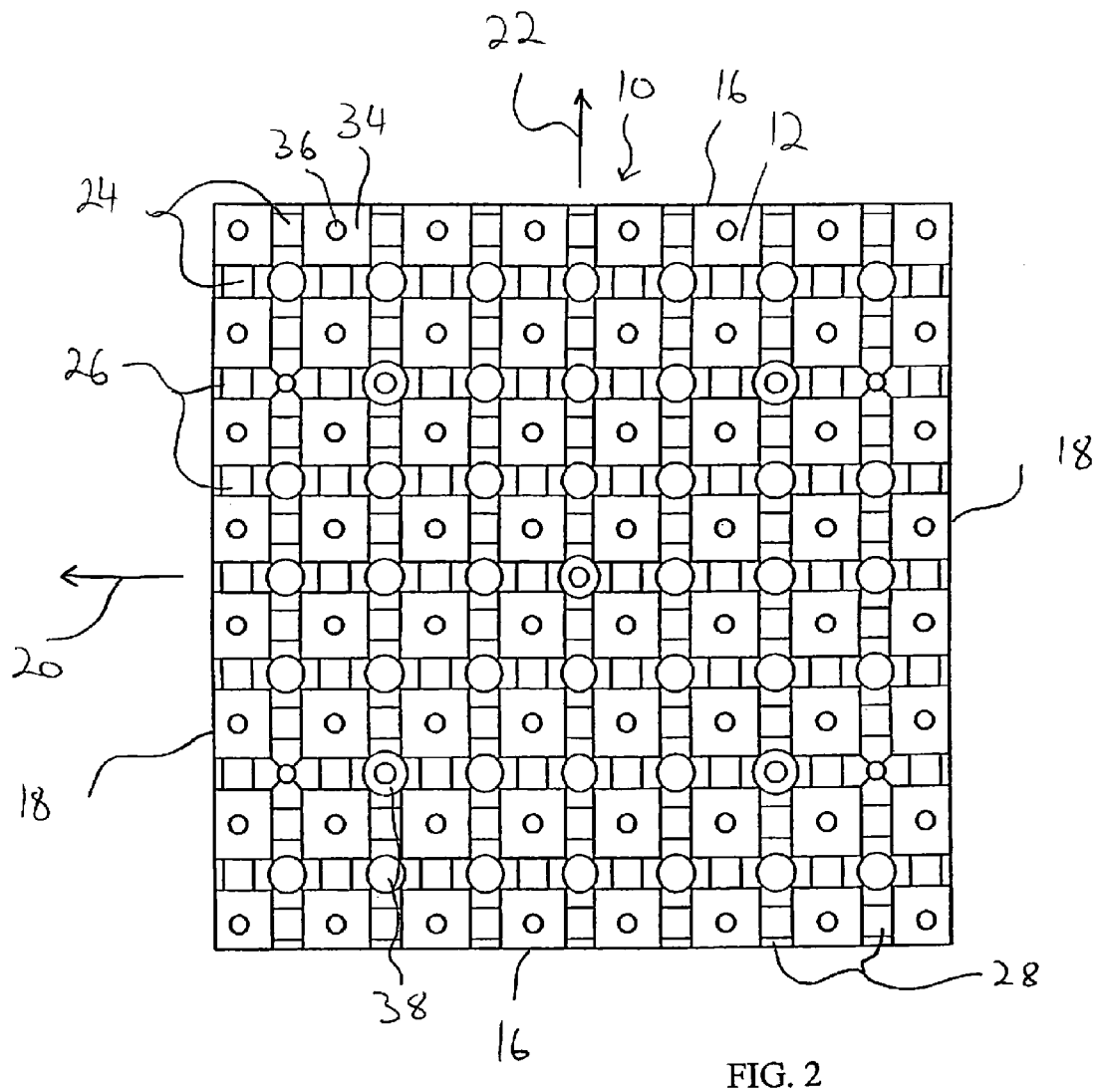
FIG. 2 is a top plan view of the table frame of FIG. 1.

Referring now to FIGS. 1-5, a highly preferred embodiment of the present inventive vibrator table frame or member 10 is shown. The table frame 10 includes an upper surface 12 and a lower surface 14 and has length sides 16 and width sides 18. The table frame 10 defines an x-axis 20 and a perpendicular y-axis 22. Although in these preferred embodiments the table frame 10 is shown to be square, the shape of the table frame could be any shape known to those in the art, such as circular, rectangular, or irregular (not shown). In a circular or irregular shape the x-axis and y-axis could be defined as needed to accomplish testing.

The table frame 10 defines a plurality of channels 24 on both surfaces. A first plurality 26 of channels 24 is defined parallel to each other in the table frame 10 and extending between the width sides 18. Each of the first plurality 26 of channels 24 is open on the upper surface 12 and on the width sides 18. In this preferred embodiment the first plurality 26 of channels 24 is also parallel to the x-axis 20. A second plurality 28 of channels 24 is defined parallel to each other in the table frame 10 and extending between the length sides 16. Each of the second plurality 28 of channels 24 is open on the upper surface 12 and on the length sides 16. In this preferred embodiment the second plurality 28 of channels 24 is also parallel to the y-axis 22.

Figure 5:
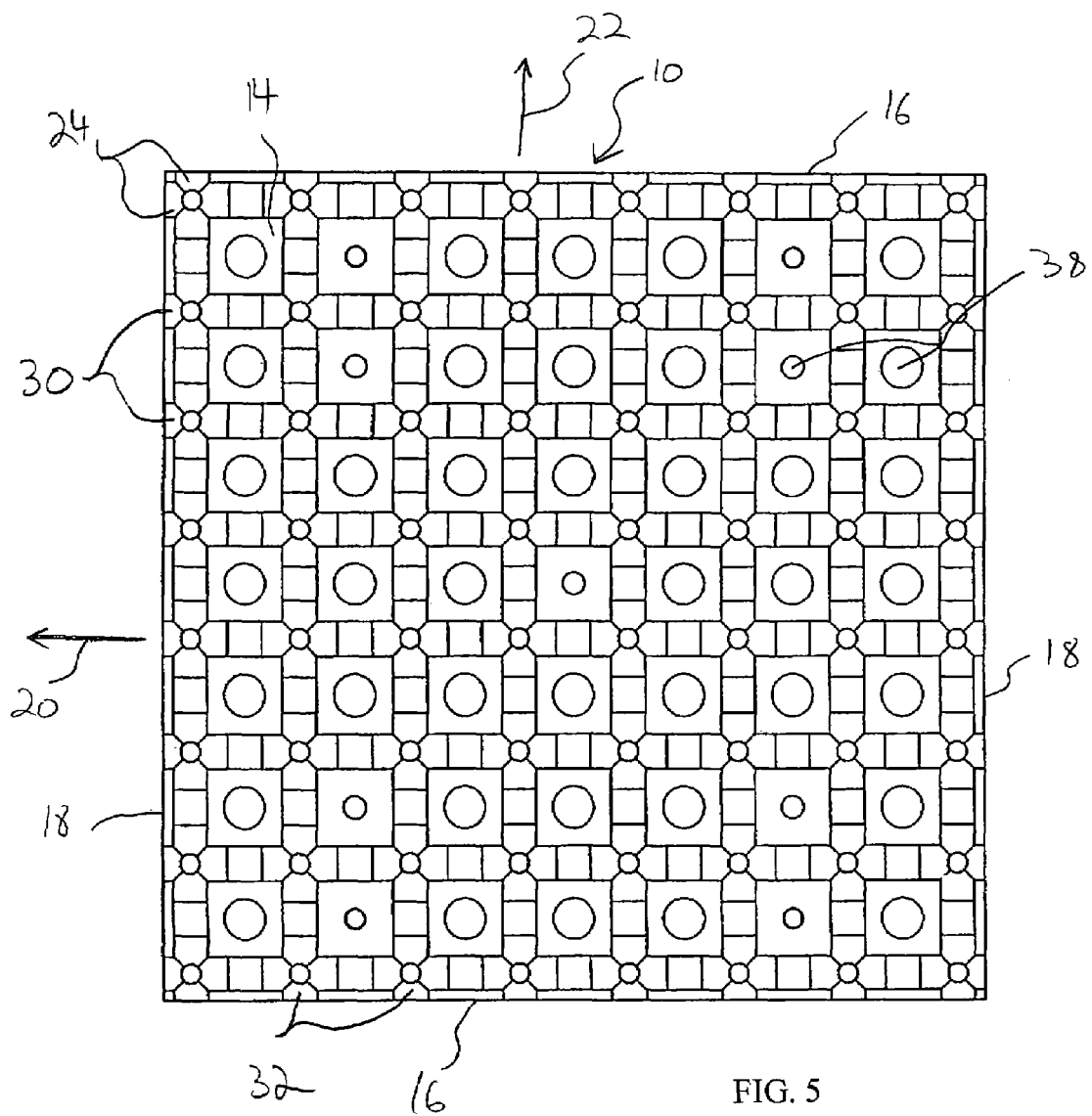
FIG. 5 is a bottom plan view of the table frame of FIG. 1.

As seen best in FIG. 5, the lower surface 14 also includes two distinct pluralities of channels 24. A third plurality 30 of channels 24 is defined parallel to each other in the table frame 10 and extending between the width sides 18. Each of the third plurality 30 of channels 24 is open on the lower surface 14 and on the width sides 18. In this preferred embodiment the third plurality 30 of channels 24 is also parallel to the x-axis 20. A fourth plurality 32 of channels 24 is defined parallel to each other in the table frame 10 and extending between the length sides 16. Each of the fourth plurality 32 of channels 24 is open on the lower surface 14 and on the length sides 16. In this preferred embodiment the fourth plurality 32 of channels 24 is also parallel to the y-axis 22.

Figure 3:
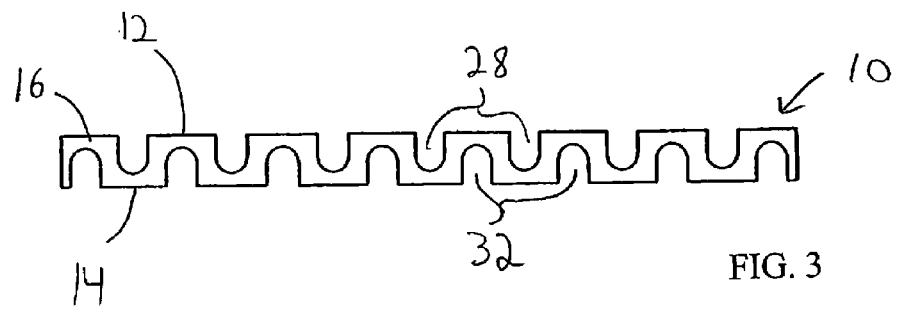
FIG. 3 is a side plan view of the table frame of FIG. 1.
Figure 4:
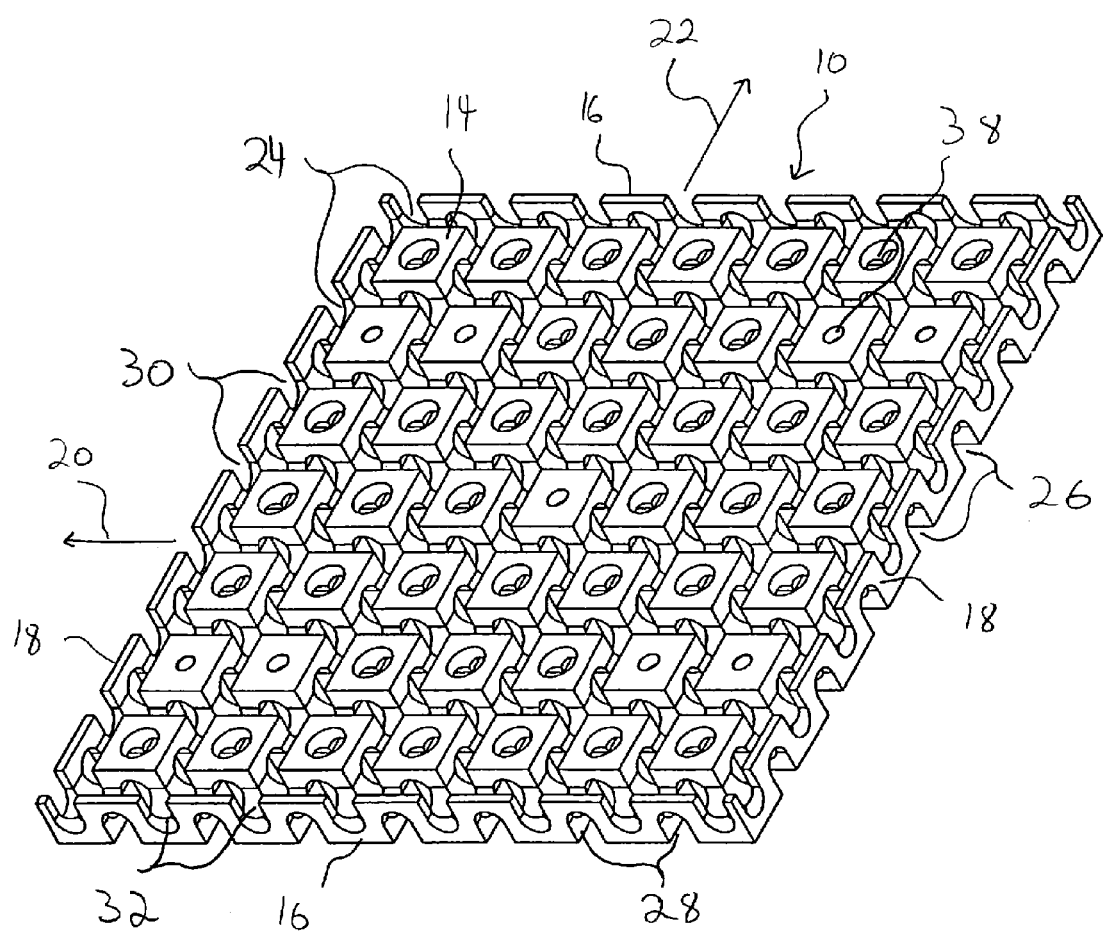
FIG. 4 is a perspective bottom view of the table frame of FIG. 1.

It is highly preferred that within each of the pluralities of channels 24, the channels 24 are spaced equally apart from each other. As seen best in FIGS. 2 and 5, this spacing creates a grid-like arrangement of intersecting channels 24 on both the upper surface 12 and the lower surface 14. Referring now to FIG. 3, it is also highly preferred that the parallel pluralities of channels 24, for example the second plurality 28 and fourth plurality 32 (both extending between the length sides 16 and parallel with the y-axis 22), be arranged as offset from one another, thereby reducing the material of the table frame 10 as much as possible while still providing the needed strength. However, in other, less-preferred embodiments (not shown) the channels 24 could be less offset, or even aligned with each other if each channel 24 was not as deep, or if the table frame 10 was thicker.

The upper surface 12 of the table frame 10 further includes a plurality of platforms 34. The platforms 34 are defined by the grid of intersecting channels 24 and thus are spaced equally apart from each other. In preferred embodiments the platforms 34 include attachment holes 36. As discussed further below, the attachment holes 36 can either be used to mount an object to be tested, or to attached standoffs.

The intersections of the channels 24 of the first plurality 26 with the channels 24 of the second plurality 28 further can define openings 38. In highly preferred embodiments, most, if not all, of these intersections define openings 38 and the openings 38 are circular. The purpose of the openings is two-fold. First, to minimize the amount of material in the frame 10 to maximize the flexibility, and second, to give mounting points for vibrators 40. The table frame 10 itself can be made of a variety of materials known to those in the art such as a polymer or magnesium; however, it is preferred that the table frame 10 is made from aluminum.

Figure 6:
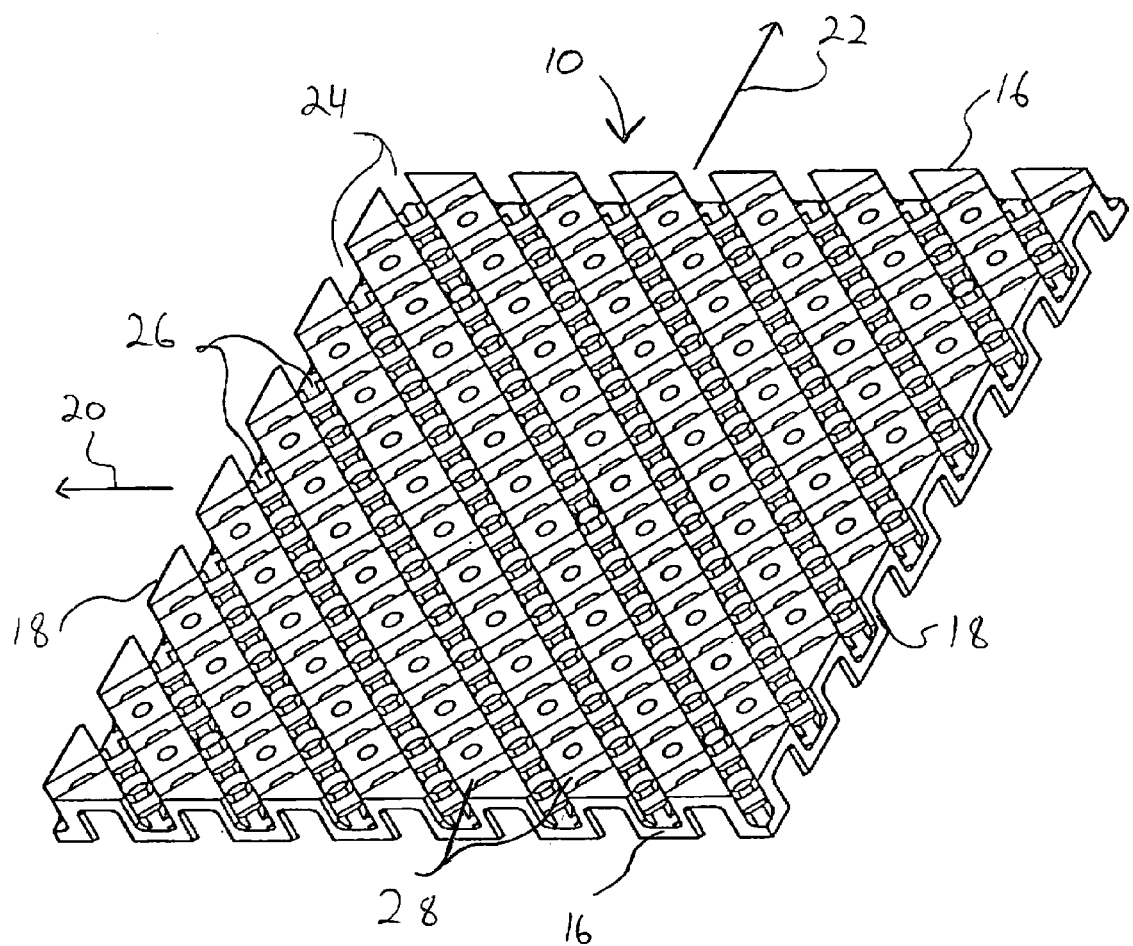
FIG. 6 is a perspective top view of an alternative embodiment of a table frame.
Figure 7:
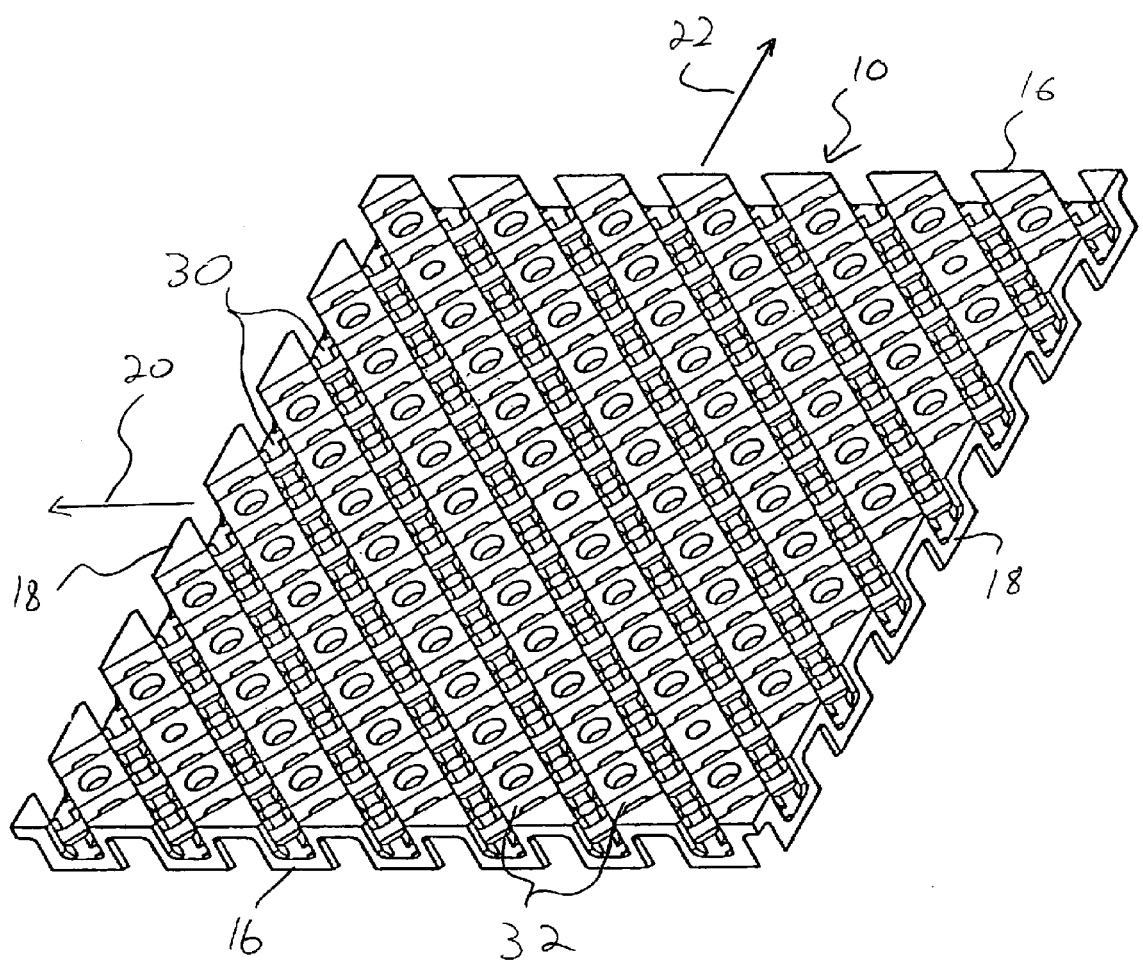
FIG. 7 is a perspective bottom view of the table frame of FIG. 6.

An alternative embodiment of the present invention is shown in FIGS. 6 and 7. In this embodiment each of the channels 24 extend between a length side 16 and a width side 18. The channels 24 of the first plurality 26 and third plurality 30 are offset from parallel with the x-axis by about 45 degrees. Since, the second plurality 28 and fourth plurality 32 are substantially perpendicular to the first plurality 26 and third plurality 30, respectively, the second plurality 28 and fourth plurality 32 are offset from the y-axis by about 45 degrees.

Figure 8:
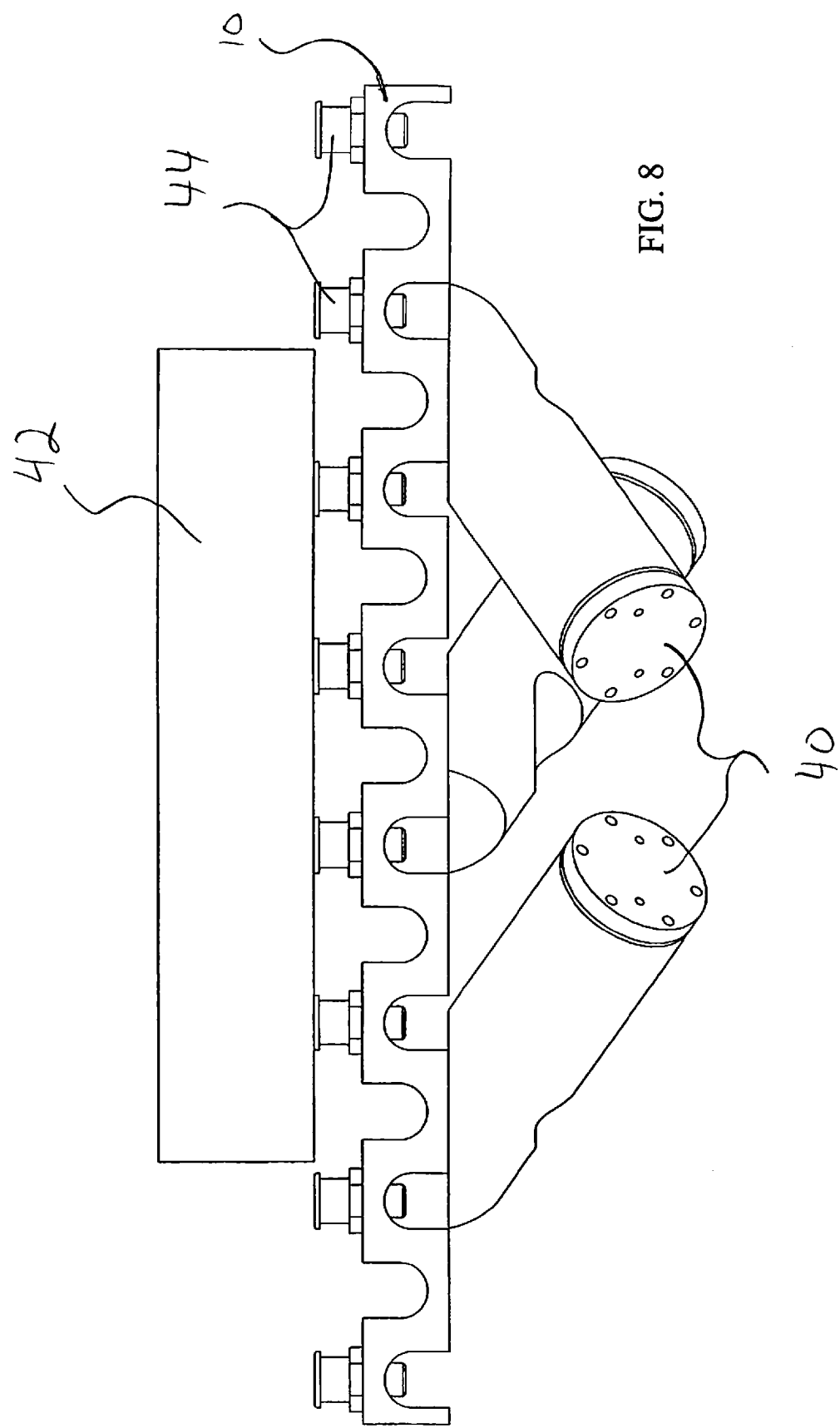
FIG. 8 is side plan view of the table from of FIG. 1 with vibrators attached and including an object to be tested secured to the table frame via standoffs.
Figure 9:
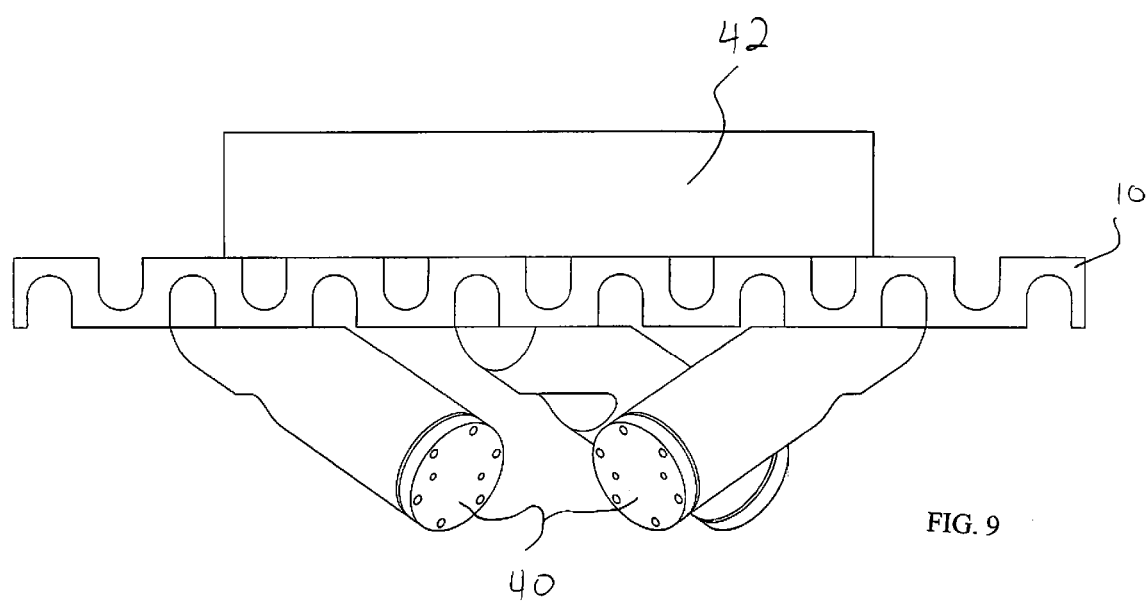
FIG. 9 is side plan view of the table from of FIG. 1 with vibrators attached and including an object to be tested secured directly to the table frame.
Figure 10:
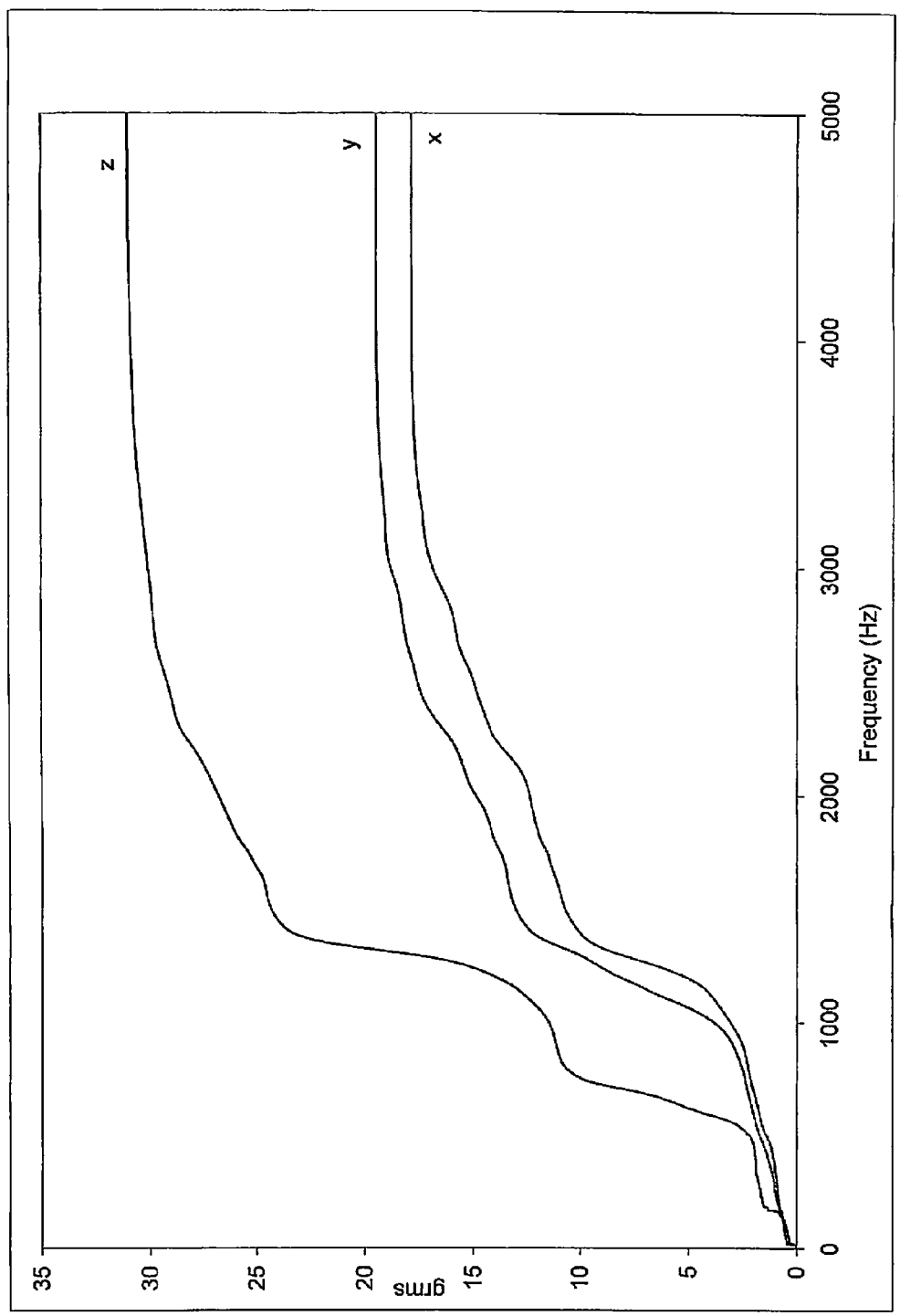
FIG. 10 is a chart showing the vibration energy along the x, y and z axes of a typical prior art vibrator table frame.
Figure 11:
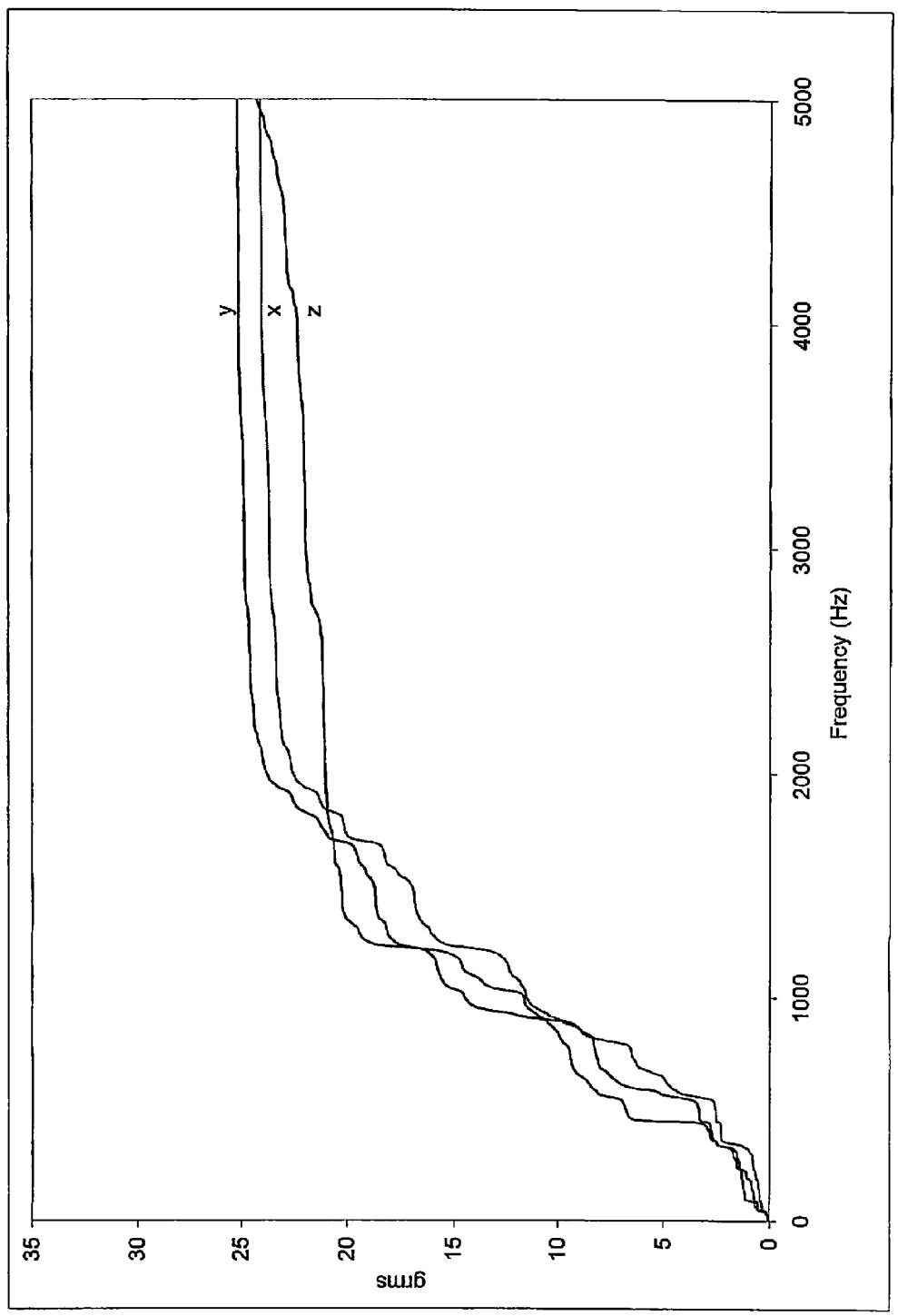
FIG. 11 is a chart showing the vibration energy along the x, y and z axes of a vibrator table frame made according to the current invention.

Referring now to FIGS. 8 and 9, in use the table frame 10 is a part of a vibrator testing apparatus (not shown) known in the art. Vibrators 40 are attached to this preferred embodiment of the table frame 10 at the openings 38. An object 42 to be tested is then secured to the table frame 10. This can be done in a variety of manners. For example, FIG. 8 shows the object 42 secured to the table frame 10 on top of a plurality of standoffs 44, the standoffs 44 being attached to the table frame 10 at the attachment holes 36. Alternatively, as shown in FIG. 9, the object 42 can be placed directly onto the table frame 10. Once the object 42 is attached, the vibrators 40 are then energized and the table frame 10 and object 42 are vibrated.

While the principles of the invention have been shown and described in connection with specific embodiments, it is to be understood that such embodiments are by way of example and are not limiting.

The invention claimed is:

1. In a vibrator table apparatus including a primary table member driven by at least two vibrators, the primary table member including upper and lower surfaces and defining x and y axes, the improvement wherein at least one of the upper and lower surfaces of the primary table member defines an opening for each of a first plurality of substantially parallel channels and an opening for each of a second plurality of substantially parallel channels substantially perpendicular to the first plurality of channels.

2. The apparatus of claim 1 wherein the first plurality of channels is substantially parallel with the x-axis.

3. The apparatus of claim 1 wherein the first plurality of channels is offset from parallel to the x-axis.

4. The apparatus of claim 3 wherein the first plurality of channels is offset from parallel to the x-axis by about 45 degrees.

5. The apparatus of claim 1 wherein the at least one of the upper and lower surfaces is the upper surface and wherein the lower surface defines an opening for each of a third plurality of substantially parallel channels and an opening for each of a fourth plurality of substantially parallel channels substantially perpendicular to the third plurality of channel, whereby the upper surface of the member includes a plurality of platforms.

6. The apparatus of claim 5 wherein the channels of each of the first, second, third and fourth pluralities channels are spaced substantially equally apart from one another, thereby creating an upper and a lower grid of intersecting channels.

7. The apparatus of claim 6 wherein the first plurality of channels and the third plurality of channels are offset from one another.

8. The apparatus of claim 7 wherein the second plurality of channels and the fourth plurality of channels are offset from one another.

9. The apparatus of claim 6 wherein at least one intersection of a first plurality channel with a second plurality channel defines an opening.

10. The apparatus of claim 9 wherein most of the intersections of channels of the first plurality of channels with the channels of the second plurality of channels define openings.

11. The apparatus of claim 10 wherein at least one platform defines an attachment hole.

12. The apparatus of claim 1 wherein the first plurality of channels defined by the at least one of the upper and lower surfaces are spaced substantially equally from one another and the second plurality channels defined by the at least one of the upper and lower surfaces are spaced substantially equally from one another, thereby creating a grid of intersecting channels.

13. A primary table member for use in a vibrator table apparatus, the member comprising:
    an upper surface, a lower surface, two length sides, two width sides;
    a first plurality of channels defined substantially parallel to each other in the member, extending between two of the sides and open on the top surface of the member; and
    a second plurality of channels defined substantially parallel to each other in the member, extending between two of the sides and open on the top surface of the member.

14. The primary table member of claim 13 further comprising:
    a third plurality of channels defined substantially parallel to each other in the member, extending between two of the sides and open on the bottom surface of the member; and
    a fourth plurality of channels defined substantially parallel to each other in the member, extending between two of the sides and open on the bottom surface of the member.

15. The primary table member of claim 14 wherein the first and third pluralities of channels extend between the two width sides.

16. The primary table member of claim 15 wherein the first and second pluralities of channels are substantially perpendicular to each other.

17. The primary table member of claim 16 wherein the third and fourth pluralities of channels are substantially perpendicular to each other.

18. The primary table member of claim 14 wherein each of the channels in the first and third pluralities of channels extend between a length side and a width side.

19. The primary table member of claim 14 wherein the first plurality of channels are spaced substantially equally apart from one another and the second plurality of channels are spaced substantially equally apart from one another, thereby creating an upper grid of intersecting channels.

20. The primary table member of claim 19 wherein the third plurality of channels are spaced substantially equally apart from one another and the fourth plurality of channels are spaced substantially equally apart from one another, thereby creating an lower grid of intersecting channels.

21. The primary table member of claim 20 wherein at least one intersection of one of the first plurality of channels with one of the second plurality of channels defines an opening.

22. The primary table member of claim 21 wherein most of the intersections between the first plurality of channels with the second plurality of channels define openings.

23. The primary table member of claim 22 wherein the upper side of the member defining the first and second plurality of channels is a plurality of platforms.

24. The primary table member of claim 23 wherein at least one of the platforms defines an attachment hole.

25. The primary table member of claim 20 wherein the first and third plurality of channels are offset from one another.

26. The primary table member of claim 20 wherein the second and fourth plurality of channels are offset from one another.

27. A method of vibration testing, the method comprising:
providing a testing apparatus, the apparatus including a primary table member and a plurality of vibrators attached to the primary table member, the member having:
an upper surface, a lower surface, two length sides, two width sides,
a first plurality of channels defined substantially parallel to each other in the member, extending between two of the sides and open on the top surface of the member,
a second plurality of channels defined substantially parallel to each other in the member, extending between two of the sides and open on the on the top surface of the member;
securing a product to be tested to the primary table member; and
energizing the vibrators.

28. The method of claim 27 wherein the member further includes;
a third plurality of channels defined substantially parallel to each other in the member, extending between two of the sides and open on the bottom surface of the member; and
a fourth plurality of channels defined substantially parallel to each other in the member, extending between two of the sides and open on the bottom surface of the member.

* * * * *

UNITED STATES PATENT AND TRADEMARK OFFICE
CERTIFICATE OF CORRECTION

| | | |
|---|---|---|
| PATENT NO. | : 7,784,349 B2 | Page 1 of 1 |
| APPLICATION NO. | : 11/845530 | |
| DATED | : August 31, 2010 | |
| INVENTOR(S) | : Wetzel | |

It is certified that error appears in the above-identified patent and that said Letters Patent is hereby corrected as shown below:

In column 2, line 20, delete "flame" and insert --frame--.

Signed and Sealed this
Twenty-ninth Day of March, 2011

David J. Kappos
*Director of the United States Patent and Trademark Office*